United States Patent [19]
Arai et al.

[11] Patent Number: 5,869,569
[45] Date of Patent: Feb. 9, 1999

[54] EMULSION POLYMER COMPOSITION

[75] Inventors: Zenichi Arai, Tokyo; Tomohiro Shinoda, Omiya; Kunihide Takarabe, Yokohama, all of Japan

[73] Assignee: Rohm and Haas Company, Philadelphia, Pa.

[21] Appl. No.: 826,089

[22] Filed: Mar. 24, 1997

[51] Int. Cl.$^6$ .............................. C08L 33/00; C08L 43/02
[52] U.S. Cl. ................................ 524/823; 106/3; 524/829
[58] Field of Search .................................... 524/829, 823; 106/3

[56] References Cited

U.S. PATENT DOCUMENTS

| | | | |
|---|---|---|---|
| 3,037,952 | 6/1962 | Jordan, Jr. et al. | 524/501 |
| 3,328,325 | 6/1967 | Zdanowski | 524/77 |
| 3,467,610 | 9/1969 | Flarman | 524/77 |
| 3,573,239 | 3/1971 | Zdanowski | 524/77 |
| 3,711,436 | 1/1973 | Oliver et al. | 524/424 |
| 3,808,036 | 4/1974 | Zdanowski | 427/445 |
| 3,928,273 | 12/1975 | Chang et al. | 524/512 |
| 3,949,107 | 4/1976 | Schoenholz et al. | 427/316 |
| 4,046,726 | 9/1977 | Meiner et al. | 524/561 |
| 4,150,005 | 4/1979 | Gehman et al. | 524/533 |
| 4,168,255 | 9/1979 | Lewis et al. | 524/340 |
| 4,252,852 | 2/1981 | Goth | 428/336 |
| 4,460,734 | 7/1984 | Owens et al. | 524/376 |
| 4,517,330 | 5/1985 | Zdanowski et al. | 524/408 |
| 4,894,397 | 1/1990 | Morgan et al. | 523/201 |
| 5,308,890 | 5/1994 | Snyder | 523/201 |
| 5,319,018 | 6/1994 | Owens et al. | 524/556 |
| 5,356,968 | 10/1994 | Rupaner et al. | 524/157 |
| 5,574,090 | 11/1996 | Gray et al. | 524/560 |
| 5,618,859 | 4/1997 | Maeyama et al. | 523/201 |
| 5,676,741 | 10/1997 | Gray et al. | 106/3 |

FOREIGN PATENT DOCUMENTS

| | | |
|---|---|---|
| 348565 A1 | 1/1990 | European Pat. Off. . |
| 56-32569 | 4/1981 | Japan . |

*Primary Examiner*—Robert H. Harrison
*Attorney, Agent, or Firm*—Ronald D. Bakule

[57] ABSTRACT

An emulsion polymer composition having fast drying properties that provides floor polish coating materials having superior resistance to black heel marks, resistance to scuffing, resistance to abrasion, adhesion, and resistance to cleaning agents characteristics, is obtained from a film forming emulsion polymer composition comprising from greater than 60 wt % to 95 wt % of a first emulsion copolymer having a glass transition temperature within the range of from 10°–100° C., and from 5 wt % to less than 40 wt % of a second emulsion copolymer having a glass transition temperature that is lower than that of the first emulsion copolymer and is within the range of from 0°–50° C., wherein the second emulsion copolymer contains from 1 to 8% by weight of nonionic hydrophilic units selected from the group consisting of hydroxy alkyl ester of alpha, beta unsaturated acid, vinyl alcohol, alkyl-phosphato-alkyl acrylates and methacrylates, alkyl-phosphono-alkyl acrylates and methacrylates, and alkyl amides of alpha, beta unsaturated acid, and wherein the second emulsion copolymer contains less than 5% by weight of units originated from vinyl alcohol.

5 Claims, No Drawings

EMULSION POLYMER COMPOSITION

This invention concerns a film forming emulsion polymer having fast drying properties and coating materials having superior mechanical strength obtained from this emulsion polymer. In particular, this invention concerns an emulsion polymer composition that provides floor polish coating materials having superior resistance to black heel marks, resistance to scuffing, resistance to abrasion, adhesion, and resistance to cleaning agents characteristics, and floor polish coatings obtained from this polymer emulsion.

Polymers in film forming latex have sufficient softness for creating films that display good binding characteristics; however, they also require a sufficient hardness necessary for high strength, display low dust attraction, and require a number of related characteristics necessary in special applications. It is known that if the polymer glass transition temperature (Tg) is lower than the film forming temperature, a coating that displays good binding characteristics generally results when the latex drys. However, the softness of latex polymers that results in the good coatings denotes softness or adhesive characteristics that are in opposition to the creation of coatings that display strength, hardness, resistance to abrasion and toughness. An accepted method in this field of technology used to avoid the dilemma encountered in the use of polymers, namely, a dilemma in that is necessary to have sufficient softness in order to form a coating having good binding characteristics, but, on the other hand, in order to form a useful coating, it is necessary to have sufficient hardness, has been to add a volatile coalescent. However, increased concern over air pollution is making it necessary to eliminate the use of volatile coalescent if possible. Further, the elimination of coalescent is also economical as it reduces manufacturing costs.

Another approach for high Tg polymers having low minimum film forming temperatures (MFT), has been to incorporate a high proportion of a hydrophilic monomer (for example, those containing hydroxyl, amine, or carboxyl functional groups) to the polymer. This provides latex polymer with water swelling characteristics and at the same time softens the particles within the latex. With standard polymer concentrations, this swelling creates extremely high viscosities; and in particular, results in extremely high viscosities when the carboxyl group or amine groups neutralizes or partially neutralizes the pH at which latex is used or stored. Other defects are that the finished coat is highly sensitive to water, acidic or basic solutions. Polymers comprised of hydrophilic monomers prepared using solution polymerization methods and the application of such solutions, as concerns the use of vinyl chloride floor material coatings, are presented by J. Weiss in U.S. Pat No. 3,935,368.

Another method of resolving the problem of obtaining a hard coating in the formation of a coating that displays good binding characteristics is as presented by D. Schoenholz, et. al., in U.S. Patent No. 3,949,107. Schoenholz presents a method wherein a lustering agent containing an aqueous dispersion of the resin having a Tg of from 30° C. to 80° C. is applied to the floor, and in which either the lustering agent or the floor is preheated to a temperature greater than that of Tg of the resin.

This disclosure presents the use of latex having sufficiently low viscosity in order to obtain an appropriate formulation in relation to its application. Further, a coalescent is not required for coating formation, and moreover it yields a tough, hard coating.

Japanese Patent Publication No. 450/88 concerns an internally plasticized polymer latex and its manufacturing process, wherein a polymer latex having an unique polymer molecule alignment within the latex particles that are formed of initial stage and later stage polymers. However, the coating material obtained from this polymer latex has the drawback of having inferior mechanical strength.

This invention concerns a film forming emulsion polymer having fast drying properties and coating materials having superior mechanical strength obtained from this emulsion polymer. In particular, this invention concerns an emulsion polymer composition that provides floor polish coating materials having superior resistance to black heel marks, resistance to scuffing, resistance to abrasion, adhesion, and resistance to cleaning agents characteristics, and floor polish coatings obtained from this polymer emulsion, particularly, coating materials that are suited for use as a floor polish. Note that "fast drying properties" as used in this text of this invention indicates quick drying characteristics in comparison to prior art compositions.

As the first embodiment, the present invention provides a film forming emulsion polymer composition comprising 60 wt % or greater of a first emulsion copolymer having a glass transition temperature within the range of from 10°–100° C., and 40 wt % or less of a second emulsion copolymer having a glass transition temperature that is lower than that of the first emulsion copolymer and is within the range of from 0°–50° C., wherein the second emulsion copolymer contains less than 10% by weight of nonionic hydrophilic units selected from the group consisting of hydroxy alkyl ester of alpha, beta unsaturated acid, vinyl alcohol, alkyl-phosphato-alkyl acrylates and methacrylates, alkyl-phosphono-alkyl acrylates and methacrylates, and alkyl amides of alpha, beta unsaturated acid.

As the second embodiment, the present invention provides a film forming emulsion polymer composition comprising 60 wt % or greater of a first emulsion copolymer having a glass transition temperature within the range of from 10°–100° C., and 40 wt % or less of a second emulsion copolymer having a glass transition temperature that is lower than that of the first emulsion copolymer and is within the range of from 0°–50° C., wherein the second emulsion copolymer contains less that 5% by weight of units originated from vinyl alcohol.

As the third embodiment, the present invention provides a film forming emulsion polymer composition comprising 60 wt % or greater of a first emulsion copolymer having a glass transition temperature within the range of from 10°–100° C., and 40 wt % or less of a second emulsion copolymer having a glass transition temperature that is lower than that of the first emulsion copolymer and is within the range of from 0°–50° C., wherein the second emulsion copolymer contains less than 10% by weight of nonionic hydrophilic units selected from the group consisting of hydroxy alkyl ester of alpha, beta unsaturated acid, alkyl-phosphato-alkyl acrylates and methacrylates, alkyl-phosphono-alkyl acrylates and methacrylates, and alkyl amides of alpha, beta unsaturated acid and contains less than 5% by weight of units originated from vinyl alcohol.

In all the above embodiments, the preferred glass transition temperature range for the first emulsion copolymer is from 40°–100° C., most preferably 30°–90° C., and the preferred glass transition temperature range for the second emulsion copolymer is from 10°–40° C. The preferred amount of the first emulsion copolymer is from 60 wt %–95 wt % and the preferred amount of the second emulsion copolymer is from 40 wt %–5 wt %. Optimally, the preferred amount of the first emulsion copolymer is from 60 wt %–80 wt % and the preferred amount of the second emulsion copolymer is from 40 wt %–20 wt %. Note that the wt % of the first emulsion copolymer and the second emulsion copolymer is the ratio of the solid weight of the first emulsion copolymer or that of the second emulsion copolymer to the weight of the total solid content of the first and second emulsion copolymers.

It is desirable that the average glass transition temperature of the first emulsion copolymer and the second emulsion copolymer be 10° C. or greater and preferably within the range of from 20° C.–80° C., more preferably within the range of from 30° C.–70° C., optionally within the range of from 40° C.–70° C. The glass transition temperature of the second emulsion copolymer is lower than the glass transition temperature of the first emulsion copolymer, and it is desirable that the temperature difference be 10° C. or greater, preferably 30° C. or greater, more preferably 40° C. or greater, and optimally, that the temperature difference be 40° C.–90° C.

Any compounds having additionally polymerisable ethylenically unsaturated bonds can be used as the starting materials of the first emulsion copolymer and the second emulsion copolymer contained in the emulsion polymer composition of this invention, and, for example, various acrylic esters and methacrylic esters can be used. Further, acid monomers such as acrylic acid, methacrylic acid, and itaconic acid can be used. Moreover, polyfunctional unsaturated monomers such as ethylene glycol dimethacrylate, divinyl benzene, trimethylol propane trimethacrylate, and allyl methacrylate can be included.

With the exception of the restrictions on glass transition temperatures, any of these compounds can be used as the starting materials of the first emulsion copolymer and the second emulsion copolymer, and further, the same monomers can be used as the starting material of both the first emulsion copolymer and the second emulsion copolymer.

Examples of compounds suitable for use as the starting material of the first emulsion copolymer having the high glass transition temperature include such as, for example, methyl methacrylate, ethyl methacrylate, propyl methacrylate, isopropyl methacrylate, isobutyl methacrylate, n-butyl methacrylate, sec-butyl methacrylate, t-butyl methacrylate, t-amyl methacrylate, t-butyl or t-amyl acrylate, cyclohexyl acrylate or methacrylate, benzyl or isopornyl, acrylonitrile or methacrylonitrile, styrene, vinyl chloride, chlorostyrene, vinyl acetate, and α-methyl styrene.

Examples of compounds suitable for use as the base material of the second emulsion copolymer having the low glass transition temperature include such as, for example, methyl acrylate, ethyl acrylate, propyl acrylate, isopropyl acrylate, butyl acrylate, isobutyl acrylate, sec-butyl acrylate, amyl acrylate, isoamyl acrylate, hexyl acrylate, 2-ethylhexyl acrylate, octyl acrylate, 3,5,5-tri methylhexyl acrylate, decyl acrylate, dodecyl acrylate, cetyl acrylate, octadecyl acrylate, octadecenyl acrylate, n-amyl methacrylate, sec-amyl methacrylate, hexyl methacrylate, 2-ethyl butyl methacrylate, octyl methacrylate, 3,5,5-tri methylhexyl methacrylate, decyl methacrylate, dodecyl methacrylate, octadecyl methacrylate, and substitutional alkyl groups, for example, butoxyethyl acrylate or methacrylate, and others. Further, butadiene, chloroprene, isobutene, isoprene, acrylonitrile, methacrylonitrile, etc., can also be used.

In the first embodiment of the present invention, an amount of nonionic hydrophilic units selected from the group consisting of hydroxy alkyl ester of alpha, beta unsaturated acid, vinyl alcohol, alkyl-phosphato-alkyl acrylates and methacrylates, alkyl-phosphono-alkyl acrylates and methacrylates, and alkyl amides of alpha, beta unsaturated acid in the second emulsion copolymer is less than 10% by weight. The amount of nonionic hydrophilic units is preferably 8% by weight or less, more preferably from 1 to 8% by weight, further preferably 6% by weight or less, most preferably from 1 to 6% by weight.

As the second embodiment, an amount of units originated from vinyl alcohol in the second emulsion copolymer is less than 5% by weight. Preferably, the second emulsion copolymer contains essentially no units originated from vinyl alcohol.

In the present invention, the units which produce said units by hydrolysis is included within the scope of the units originated from vinyl alcohol. For example, the units originated from an ester of vinyl alcohol, such as vinyl acetate, vinyl propionate, and vinyl butyrate are included within the scope of the units originated from vinyl alcohol.

In the third embodiment, an amount of nonionic hydrophilic units selected from the group consisting of hydroxy alkyl ester of alpha, beta unsaturated acid, alkyl-phosphato-alkyl acrylates and methacrylates, alkyl-phosphono-alkyl acrylates and methacrylates, and alkyl amides of alpha, beta unsaturated acid in the second emulsion copolymer is less than 10% by weight. An amount of units originated from vinyl alcohol in the second emulsion copolymer is less than 5% by weight. The amount of nonionic hydrophilic units is preferably 8% by weight or less, more preferably from 1 to 8% by weight, further preferably 6% by weight or less, most preferably from 1 to 6% by weight. Preferably, the second emulsion copolymer contains essentially no units originated from vinyl alcohol.

The copolymer glass transition temperature can be calculated using the Fox equation below. Bulletin of American Physical Society, 1,3, page 123 (1956)

$$1/Tg = W1/Tg(1) + W2/Tg(2)$$

In the equation, W1 and W2 designate the polymer weight part ratio of composition 1 and composition 2, and Tg(1) and Tg(2) are the respective composition 1 and composition 2 homopolymer glass transition temperatures (units represent absolute temperature).

There are a number of commonly known methods for measuring the actual glass transition temperature of the resultant polymer, however, those using differential scan calorimetry (DSC) are preferred as the method is simple and accurate.

The average glass transition temperature can be calculated using the Fox equation in relation to the total for the monomers in the first emulsion copolymer and the second emulsion copolymer.

The glass transition temperatures for representative polymers used in this invention are

TABLE 1

| High Polymers | Tg (°C.) |
| --- | --- |
| Polymethyl acrylate | 13 |
| Polyethyl acrylate | −17 |
| Poly (n-butyl acrylate) | −45 |
| Poly (s-butyl acrylate) | −18 |
| Poly (2-ethylhexyl acrylate) | −65 |
| Polyhydroxyethyl acrylate | −15 |
| Polyacrylic acid | 110 |
| Polymethacrylic acid | 155 |
| Polymethyl methacrylate | 83 |
| Polyethyl methacrylate | 55 |
| Poly (n-butyl methacrylate) | 20 |
| Poly (i-butyl methacrylate) | 54 |

TABLE 1-continued

| High Polymers | Tg (°C.) |
|---|---|
| Polyhydroxyethyl methacrylate | 55 |
| Polyhydroxypropyl methacrylate | 73 |
| Polyglycidylmethyl methacrylate | 46 |
| Polyacryl amide | 165 |
| Polyacrylonitrile | 140 |
| Polyvinyl chloride | 80 |
| Polyvinyl acetate | 33 |
| Poly butadiene | −83 |
| Polystyrene | 83 |
| Polyitaconic acid | 165 |

The emulsion polymer composition as concerns this invention can be prepared using any commonly known methods; however, it is preferred that the composition be prepared using emulsion polymerization.

During polymerization, standard dispersants, for example, anionic and/or nonionic emulifying agent, such as, alkali metal salts or ammonium salts of alkyl sulfate, alkyl sulfonate and fatty acids, and oxyethylated phenol, can be used. Preferred surface active agents are alkyl sulfate esters and polyoxyethylene alkyl sulfate esters that are anionic surface active agents, and, for example, sodium lauryl sulfate, triethanol amine lauryl sulfate, ammonium lauryl sulfate, sodium dodecyl benzene sulfonate, sodium alkyl naphthalene sulfonate, sodium polyoxyethylene alkyl ether sulfonate, triethanol amine polyoxyethylene alkyl ether sulfate, sodium polyoxyethylene alkyl phenol ether sulfate can be suitably used. The amount of dispersant used, generally, is from 0.1–6 wt % in relation to the total monomer weight.

Either thermal initiation or redox initiation methods can be used as the polymerization initiation method. Common free radical initiating agents (hydrogen peroxide, t-butyl hydroperoxide, ammonium persulfate and/or alkali metal salts, etc.) can be used. The amount used is, typically, 0.05–3.0 wt % in relation to the total monomer weight. Similarly, initiating agents can be used in combination with appropriate reductants (for example, isoascorbic acid, sodium bisulfite) at the same levels as the redox systems that are used.

Low levels of chain transfer agents such as mercaptans (for example, n-octyl mercaptan, n-dodecyl mercaptan, butyl mercaptopropionic acid, methyl mercaptopropionic acid, or mercaptopropionic acid at 0.05–6 wt % in relation to the total monomer weight) can often be used to limit significant gelation or to control molecular weight.

Core/shell polymers, in other words polymers having a internal polymer core phase and an outer polymer shell phase, are suited for use as the polymer contained in the emulsion polymer composition as concerns this invention. The core/shell polymer can be prepared using commonly known manufacturing processes; however, it is particularly preferred that it is provided as an emulsion that has been prepared using multi-stage emulsion copolymerization methods. For example, a polymer emulsion for which, first a core phase is created using the above mentioned monomers, followed by the creation of an outer shell phase using different ethylenically unsaturated monomers.

Internally plasticized polymer latex particles, namely polymer latex particles that have been formed through the continuous polymerization of hard polymers with soft polymer latex particles, can also be suitably used. For example, under normal emulsion polymerization conditions, this can be prepared through the emulsion polymerization of a first ethylenically unsaturated monomer mixture to prepare a second emulsion polymer, followed by the emulsion polymerization of a second ethylenically unsaturated monomer mixture to prepare the first polymer emulsion.

Further, the emulsion polymer composition of this invention can be prepared through the blending of two types of emulsion polymers. In other words, the emulsion polymer composition as concerns this invention can be prepared by blending a first emulsion copolymer having a glass transition temperature within the range of from 10°–100° C. and a second emulsion copolymer having a glass transition temperature that is lower than that of the first emulsion copolymer and is within the range of from 0°–50° C., wherein the second emulsion copolymer contains less than 10% by weight of nonionic hydrophilic units selected from the group consisting of hydroxy alkyl ester of alpha, beta unsaturated acid, vinyl alcohol, alkyl-phosphato-alkyl acrylates and methacrylates, alkyl-phosphono-alkyl acrylates and methacrylates, and alkyl amides of alpha, beta unsaturated acid, so that in relation to the total solid component weight of the first emulsion copolymer and the second emulsion copolymer, the first emulsion copolymer solid component weight is 60 wt % or greater, and the second emulsion copolymer solid component weight is 40 wt %.

The emulsion polymer of the second embodiment of the present invention can be prepared by using the second emulsion copolymer which contains less than 5% by weight of units originated from vinyl alcohol. The emulsion polymer of the third embodiment of the present invention can be prepared by using the second emulsion copolymer which contains less than 10% by weight of nonionic hydrophilic units selected from the group consisting of hydorxy alkyl ester of alpha, beta unsaturated acid, alkyl-phosphato-alkyl acrylates and methacrylates, alkyl-phosphono-alkyl acrylates and methacrylates, and alkyl amides of alpha, beta unsaturated acid and contains less than 5% by weight of units originated from vinyl alcohol. The preferred range for the mixture proportions, average glass transition temperature, and difference in glass transition temperature, etc., are the same as for the previous cases described above.

A polyvalent metal compound is added when a film is to be formed from the emulsion polymer composition as concerns this invention. In this case, it is necessary for at least one of either the first emulsion copolymer or the second emulsion copolymer to contain a carboxylic acid group. In other words, this invention provides the emulsion polymer composition of the before-mentioned embodiment, that further contains a polyvalent methyl compound, and at least one of either the first emulsion copolymer or the second emulsion copolymer contains a carboxylic acid group.

The polyvalent metal compound is provided in a water soluble or water dispersible form, and can be included in metal ion, salts, complex or oxide form. The polyvalent metal compound can be added after other optional components have been blended; however, it is preferred that the other components are added after the emulsion polymer composition has been modified by the polyvalent metal compound. Pre-modification of the emulsion polymer by the polyvalent metal compound allows for the preservation of a balance between emulsion polymer film's elongation and tensile strength under a wider temperature range.

As a modification method, polyvalent metal compound powder can be dispersed in water and added to the emulsion polymer composition; however, it is preferred that the polyvalent metal is firstly changed to a complex of a polyvalent metal ion, or a salt is made from a polyvalent metal ion and its counter ion, thereby making the polyvalent metal water soluble or water dispersible. The polyvalent metal ion complex can solubilize in alkaline solution such as a dilute aqueous ammonia solution having pH=9–10. The water soluble or water dispersible polyvalent metal can be added to the emulsion maintained at a temperature of 30°–50° C. to modify the emulsion polymer with the polyvalent metal.

Polyvalent metal ions such as calcium, aluminum, magnesium, zinc, barium, strontium, etc., can be used. Polyvalent metal ion complexes, for example, zinc hexaammonia, zinc ammonium bicarbonate, and the like, and polyvalent metal ions and counter ions, for example, chloride ions, acetate ions, bicarbonate ions and their salts can be used. Zinc is the preferred polyvalent metal.

The polyvalent metal ion, salt, complex or oxide is preferably used at about 0.1 wt % to about 10 wt % in relation to the emulsion polymer solid component weight, and more preferably at a weight about 0.3 wt %–about 2.0 wt %.

The emulsion polymer composition of the present invention has fast drying properties and the coating materials obtained therefrom has superior mechanical strength. The emulsion polymer composition of the present invention provides a floor polish composition having superior resistance to black heal marks, resistance to scuffing, resistance to abrasion, adhesion, and resistance to cleaning agents.

The emulsion polymer composition of the present invention has fast drying properties that the film dries within 5 minutes, preferably within 3 minutes under the condition described in the after-mentioned examples.

The emulsion polymer composition of the present invention can include pigments, dyes, fillers, antioxidant, antiozonants, stabilizers, flow control agents, surfactants and other components.

The emulsion polymer composition of this invention is particularly useful as a substitute in emulsion+plasticizer or emulsion+coalescent systems that include the numerous formulations that cover a broad range of emulsion polymer applications. These latex materials are useful both in independent film forming and coating materials, for example, paints, lacquers, vanishes, powdered paints and other coating materials. The emulsion polymer composition of this invention is also useful as an impregnant and adhesive for natural and synthetic material, such as paper, cloth, wood, plastic, metal and laser, and further as a binder for nonwoven cloth. The emulsion polymer composition of this invention can be used in combination with other emulsions or latex systems to lower the minimum film forming temperature, or can be used to aid coating formation in the said other emulsion or latex systems. Pigments, dyes, filler material, antioxidant, anti-ozonants, stabilizers, flow control agents, surface active agents, and other optional components can be included in the emulsion polymer composition of this invention.

In particular, the polymer emulsion composition of this invention can be suitably used as paint, filling and adhesive, and application method, such as paint brush, roller, immersion, spraying, and other coating methods known in various fields of technology can be used to apply the emulsion polymer composition of this invention.

This invention further concerns coating materials obtained from the emulsion polymer composition of this invention.

The morphology of the obtained coating material varies according the weight ratio of the first emulsion copolymer and the second emulsion copolymer, their respective glass transition temperatures, film forming conditions, and other such factors, and is not specifically designated; however, under the preferred conditions of this invention, the coating material of this invention has a morphology wherein, the first emulsion copolymer forms a continuous phase and the second emulsion copolymer forms a continuous or non-continuous phase. In the case when the hard phase comprising the emulsion polymer having the higher glass transition temperature forms continuous phase, a good coating material having superior endurance and mechanical strength can be obtained. In this case, the soft phase serves as an adhesive or coalescent for the said hard phase, and it is believed that it is for this reason that it is possible for the hard phase to form a continuous film phase, together with reducing the film forming time and providing fast drying characteristics. When used as a floor polish coating material, the coating material obtained from the emulsion polymer composition of this invention can provide floor polish coating materials having superior resistance to black heal marks, resistance to scuffing, resistance to abrasion, adhesion, and resistance to cleaning agents characteristics; and, moreover, because the said coating material has a fast drying characteristics, it is particularly suited to floor polish film forming using machines.

The emulsion polymer composition of this invention is appropriate for use as a floor polish composite as presented by, for example, Zdanowski in U.S. Pat. No. 3,328,325, Fairman in U.S. Pat. No. 3,467,610, and in a second invention by Zdanowski as presented in U.S. Pat. No. 3,573,239.

In general, the floor polish compound that uses the emulsion polymer composition of this invention can be prepared using the mixture presented below.

| Component | Proportion |
|---|---|
| (A) Emulsion polymer composition (weight) | 10–100 |
| (B) Wax (as above) | 0–90 |
| (C) Alkali soluble resin (as above) | 0–90 |
| (D) Wetting agent, emulsifier, and dispersant (percent) | 0.5–20 |
| (E) Water to make the total solid component is from 0.5 % to 45%, and preferably from 5% to 30%. | |

(D) is a weight percentage in relation to the weight of A + B + C.

The total for A, B and C must equal 100. When used, the weight of C used can be up to 90% in relation to the weight of copolymer A, and preferably it should be in the range of from about 5% to 25% of the weight of copolymer A.

Examples of wetting agents and dispersants include alkali metal salts and amino salts of higher fatty acid having a carbon number of from 12 to 18, for example, sodium, potassium or ammonium salt of oleic acid and silinolic acid, morpholine and standard nonionic surface active agents.

A detailed explanation of this invention is presented below based on working examples; however, the range of this invention is not limited to the working examples presented. In the working examples, unless otherwise specified, parts and percentages indicate weight.

WORKING EXAMPLES 1–5

Preparation of the Monomer Mixture

A 30% sodium lauryl sulfate (SLS) solution was added to deionized water and an emulsified monomer mixture was prepared by the slow, continuous addition of monomers to the stirred solution. The abbreviations for the compounds used in these working examples are as listed below.

| | |
|---|---|
| Butyl acrylate | BA |
| 2-ethylhexyl acrylate | 2-EHA |

-continued

| Methyl methacrylate | MMA |
| Hydroxyethyl methacrylate | HEMA |
| Styrene | Sty |
| Methacrylic acid | MAA |
| Acrylic acid | AA |
| Sodium lauryl sulfate | SLS |
| Ammonium persulfate | APS |

The respective amounts of deionized water, sodium lauryl sulfate, and monomers used in these working examples are shown in Table 2.

heat of the polymerization reaction by cooling (2–3 hours). The polymerization reaction temperature was cooled when required to maintain a temperature between 85°–90° C. When the addition of the mixture was completed, the monomer mixture container and supply tube were rinsed using ²58.2 g of deionized water and this was added to the reaction container. The obtained emulsion polymer was cooled to 60° C., and the said polyvalent metal solution was added. The pH was adjusted to 8.0–8.5 using aqueous ammonia. This method was used to obtain emulsion polymers 1–5.

TABLE 2

| | Working Example 1 | | Working Example 2 | | Working Example 3 | | Working Example 4 | | Working Example 5 | |
|---|---|---|---|---|---|---|---|---|---|---|
| | First Stage | Second Stage | First Stage | Second Stage | First Stage | Second Stage | First Stage | Second Stage | First Stage | Second Stage |
| Deionized wate | 530.6 | 2246.7 | 530.6 | 2246.7 | 1061.2 | 1685.00 | 795.9 | 1965.9 | 530.6 | 1965.9 |
| SLS (30%) | 33.3 | 80.5 | 33.3 | 80.5 | 66.6 | 60.4 | 50.0 | 70.4 | 50.0 | 70.4 |
| BA | 677.2 | | 657.2 | | 1381.3 | | 860.4 | | 860.4 | |
| 2-EHA | | 1572.0 | | 151.0 | | | | 137.1 | | 441.0 |
| MMA | 498.4 | 340.0 | 518.4 | 637.3 | 865.3 | 390.9 | 903.2 | 1540.0 | 903.2 | 1232.0 |
| HEMA | 65.3 | | 15.3 | | 130.6 | | 97.8 | | 97.8 | |
| Sty | | 3050.8 | | 4179.2 | | 3127.2 | | 2664.3 | | 2665.2 |
| MAA | 41.8 | | 41.8 | | 151.5 | | 63.3 | | 63.3 | |
| AA (80%) | 29.4 | 326.5 | 29.4 | 326.5 | 104.4 | 488.6 | 43.0 | 285.6 | 43.0 | 231.2 |
| Calculated Tg | 3 | 15 | 5 | 90 | 4 | 100 | 13 | 91 | 13 | 69 |

Aqueous Solution of Polyvalent Metal

| Deionized water | 1617.8 |
| Glycine | 113.6 |
| Zinc oxide | 132.0 |

Polymerization—Preparation of the Emulsion Polymer

A solution consisting of 74.5 g of a 30% sodium lauryl sulfate solution (SLS) and 4050.5 g of deionized water was entered into an appropriate reaction container that was equipped with a thermometer, cooling device, and stirrer and heated to 80–85° C. 193.9 g of the above stated first stage monomer mixture and an aqueous ammonium persulfate solution (a solution in which 12.3 g APS had been dissolved in 71.0 g of deionized water) were then added in whole. Within approximately five minutes the initiation of polymerization was verified by the increase of from 5°–8° C. in temperature and the changes to the external appearance of the reaction container. After heat generation had concluded, the remaining first stage monomer mixture was gradually added to the reaction container. This was added at a rate adjusted to reduce the heat of the polymerization reaction by cooling (30–60 minutes). The polymerization reaction temperature was cooled when required to maintain a temperature between 85°90° C. When the addition of the mixture was completed, the monomer mixture container and supply tube were rinsed using 258.2 g of deionized water. This was added to the reaction container and the temperature was maintained at between 85°–90° C. for thirty minutes. After waiting thirty minutes, the second stage monomer mixture and an aqueous ammonium persulfate solution (a solution in which 19.3 g APS had been dissolved in 801.1 g of deionized water) were then gradually added to the reaction container. These were added at a rate adjusted to reduce the

COMPARATIVE EXAMPLE 1

Preparation of the Monomer Mixture

The following monomers were gradually added to a solution consisting of 20.0 g of a 30% sodium lauryl sulfate (SLS) solution and 1145.4 g deionized water to prepare an emulsified monomer mixture.

| Butyl acrylate | 331.9 |
| 2-ethylhexyl acrylate | 53.1 |
| Methyl methacrylate | 974.5 |
| Hydroxyethyl methacrylate | 79.7 |
| Styrene | 1083.3 |
| Methacrylic acid | 26.6 |
| Acrylic acid (80%) | 132.7 |

Aqueous Solution of Polyvalent Metal

| Deionized water | 357.1 |
| Glycine | 23.0 |
| Zinc Oxide | 26.8 |

Polymerization—Preparation of the Emulsion Polymer

A solution consisting of 34.3 g of a 30% sodium lauryl sulfate solution and 872.4 g of deionized water were entered into an appropriate reaction container that was equipped with a thermometer, cooling device, and stirrer and heated to 80°–85° C. 38. 0 g of the above stated first stage monomer mixture and an aqueous ammonium persulfate solution (a solution in which 2.5 g APS had been dissolved in 14.4 g of deionized water) were then added in whole. Within approximately five minutes the initiation of polymerization was verified by the increase of from 5°–8° C. in temperature and the changes to the external appearance of the reaction container. After heat generation had concluded, the remaining monomer mixture and an aqueous ammonium persulfate solution (a solution in which 3.9 g APS had been dissolved in 162.1 g of deionized water) were gradually added to the reaction container. This was added at a rate adjusted to reduce the heat of the polymerization reaction by cooling (2–3 hours). The polymerization reaction temperature was cooled when required to maintain a temperature between 85–90° C. When the addition of the mixture was completed, the monomer mixture container and supply tube were rinsed using 110.0 g of deionized water and was added to the reaction container. The obtained emulsion polymer was cooled to 60° C., and the said polyvalent metal solution was added. The pH was adjusted to 8.0–8.5 using aqueous ammonia to obtain emulsion polymer 6.

COMPARATIVE EXAMPLE 2

Preparation of the Monomer Mixture

A 30% sodium lauryl sulfate (SLS) solution was added to deionized water and the emulsified monomer mixture was prepared by the slow, continuous addition of monomers to the stirred solution. The respective amounts of deionized water, sodium lauryl sulfate, and monomers used are shown in Table 3.

TABLE 3

|  | First Stage | Second Stage |
| --- | --- | --- |
| Deionized water | 1965.9 | 795.9 |
| SLS (30%) | 70.4 | 50.0 |
| BA | 1885.0 |  |
| 2-EHA |  | 56.9 |
| MMA | 1985.4 | 657.9 |
| HEMA | 455.3 |  |
| Sty |  | 1139.1 |
| MAA | 145.7 |  |
| AA (80%) | 102.0 | 121.7 |
| Calculated Tg | 15 | 91 |

Aqueous Solution of Polyvalent Metal

| Deionized water | 1617.8 |
| --- | --- |
| Glycine | 113.6 |
| Zinc Oxide | 132.0 |

Polymerization—Preparation of the Emulsion Polymer

A solution consisting of 74.5 g of a 30% sodium lauryl sulfate solution and 4050.5 g of deionized water was entered into an appropriate reaction container that was equipped with a thermometer, cooling device, and stirrer and heated to 80°–85° C. 193.9 g of the above stated first stage monomer mixture and an aqueous ammonium persulfate solution (a solution in which 12.3 g APS had been dissolved in 71.0 g of deionized water) were then added in whole. Within approximately five minutes the initiation of polymerization was verified by the increase of from 5°–8° C. in temperature and the changes to the external appearance of the reaction container. After heat generation had concluded, the remaining first stage monomer mixture was gradually added to the reaction container. This was added to at a rate adjusted to reduce the heat of the polymerization reaction by cooling (30–60 minutes). The polymerization reaction temperature was cooled when required to maintain a temperature between 85°–90° C. When the addition of the mixture was completed, the monomer mixture container and supply tube were rinsed using 258.2 g of deionized water. This was added to the reaction container and the temperature was maintained at between 85°–90° C. for thirty minutes. After waiting thirty minutes, the second stage monomer mixture and an aqueous ammonium persulfate solution ( a solution in which 19.3g APS had been dissolved in 801.1 g of deionized water) were then gradually added to the reaction container. This was added at a rate adjusted to reduce the heat of the polymerization reaction by cooling (2 –3 hours). The polymerization reaction temperature was cooled when required to maintain a temperature between 85°–90° C. When the addition of the mixture was completed, the monomer mixture container and supply tube were rinsed using 258.2g of deionized water and this was added to the reaction container. The obtained emulsion polymer was cooled to 60° C., and the said polyvalent metal solution was added. The pH was adjusted to 8.0–8.5 using aqueous ammonia. This method was used to obtain emulsion polymer 7.

COMPARATIVE EXAMPLE 3 AND WORKING EXAMPLE 6

Preparation of the Monomer Mixture

A 30% sodium lauryl sulfate solution was added to deionized water and the emulsified 25 monomer mixture was prepared by the slow, continuous addition of monomers to the stirred solution. The respective amounts of deionized water, sodium lauryl sulfate, and monomers used are shown in Table 4.

TABLE 4

|  | Emulsion polymer 8 | Emulsion polymer 9 |
| --- | --- | --- |
| Deionized water | 572.7 | 572.7 |
| SLS (30%) | 10.0 | 10.0 |
| BA | 582.9 |  |
| 2-EHA |  | 38.5 |
| MMA | 612.1 | 447.3 |
| HEMA | 66.3 |  |
| Sty |  | 774.3 |
| MAA | 42.8 |  |
| AA (80%) | 29. 1 | 82.9 |
| Calculated Tg | 13 | 91 |

Aqueous Solution of Polyvalent Metal

| Deionized water | 357.1 |
| --- | --- |
| Glycine | 23.0 |
| Zinc oxide | 26.8 |

Polymerization—Preparation of the Emulsion Polymer

A solution consisting of 34.3 g of a 30% sodium lauryl sulfate solution and 872.4 g of deionized water was entered into an appropriate reaction container that was equipped with a thermometer, cooling device, and stirrer and heated to 80°–85° C. 38.0 g of the above stated monomer mixture and an aqueous ammonium persulfate solution (a solution in which 2.5 g APS had been dissolved in 14.4 g of deionized water) were then added in whole. Within approximately five minutes the initiation of polymerization was verified by the increase of from 5°–8° C. in temperature and the changes to the external appearance of the reaction container. After heat generation had concluded, the remaining monomer mixture and an aqueous ammonium persulfate solution (solution in which 3.9 g APS had been dissolved in 162.1 g of deionized water) was gradually added to the reaction container. This was added at a rate adjusted to reduce the heat of the polymerization reaction by cooling (2–3 hours). The polymerization reaction temperature was cooled when required to maintain a temperature between 85°–90° C. When the addition of the mixture was completed, the monomer mixture container and supply tube were rinsed using 110.0 g of deionized water, this was added to the reaction container. The obtained emulsion polymer was cooled to 60° C., and the said polyvalent metal solution was added. The pH was then adjusted to 8.0–8.5 using aqueous ammonia to obtain emulsion polymer 8 and 9.

Emulsion polymers 8 and 9 were then mixed at the following weight proportions to prepare emulsion polymers 10 and 11.

COMPARATIVE EXAMPLE 3

Emulsion polymer 8 : Emulsion polymer 9=7:3 (polymer 10)

WORKING EXAMPLE 6

Emulsion polymer 8 : Emulsion polymer 9=3:7 (polymer 11)

Composition were then prepared using the respective emulsion polymers which were blended as shown in Table 5.

TABLE 5

| | Constituents | | | | | | | | |
|---|---|---|---|---|---|---|---|---|---|
| | Emulsion polymer | | | | | | | | |
| | 1 | 2 | 3 | 4 | 5 | 6 | 7 | 10 | 11 |
| Fluorine active agent (1%) note 1 | 1.0 | 1.0 | 1.0 | 1.0 | 1.0 | 1.0 | 1.0 | 1.0 | 1.0 |
| Defoaming agent (50%) note 2 | 0.03 | 0.03 | 0.03 | 0.03 | 0.03 | 0.03 | 0.03 | 0.03 | 0.03 |
| Diethyleneglycol monomethyl ether | 3.0 | 9.0 | 5.0 | | | | | | |
| Dipropyleneglycol monomethyl ether | | | | 4.0 | 4.0 | 6.0 | 5.0 | 2.0 | 4.0 |
| Dibutylphthalate | | | | 2.0 | 2.0 | 2.0 | 2.0 | 1.0 | 2.0 |
| Tributoxyethyl phosphate | 0.5 | 0.5 | 0.5 | 0.5 | 0.5 | 0.5 | 0.5 | 0.5 | 0.5 |
| Polymer emulsion (38%) | 46.1 | 46.1 | 46.1 | 46.1 | 46.1 | 46.1 | 46.1 | 46.1 | 46.1 |
| Alkali soluble resin note 3 | 3.8 | 3.8 | 3.8 | 3.8 | 3.8 | 3.8 | 3.8 | 3.8 | 3.8 |
| Polyethylene wax solution (40%) not | 11.3 | 11.3 | 11.3 | 11.3 | 11.3 | 11.3 | 11.3 | 11.3 | 11.3 |

Note 1 Fluorine type surface active agent manufactured by Sumitomo 3M (Furorado FC-129, active ingredient 50%)
Note 2 Defoaming agent manufactured by Wacker Silicones Corp. (SWS-211, active ingredient 50%)
Note 3 Alkali soluble resin manufactured by Rohm and Haas (Primal 1-1955, active ingredient 40%)
Note 4 Polyethylene wax emulsion manufactured by Toho Chemicals KK (Hitech E-4B, active ingredient 40%)

The results of the evaluation tests for the obtained compounds are shown in Table 6.

In Table 6 presents an evaluation of the emulsion polymer numbers corresponding to the emulsion polymer comprised of the mixtures as presented in Table 5. Emulsion polymers 1–5 and I 1 are working examples as concerns this invention, and the others are comparative examples.

Test Methods

Resistance to black heel marks, water resistance, resistance to cleaning agent 1, and removal characteristics tests were conducted in accordance with Japan Industrial Standards (JIS) K3920. Scuffing resistance was evaluated by observing the marring on tiles following the completion of resistance to black heel marks tests conducted in accordance to item 15 within JIS K3920. Resistance to cleaning agent 2 was conducted using ¹/₂₀. Forward (registered brand name) which was applied three times to tiling and spread using a mop. Five minutes later a 175 rotation polisher was applied to the tiling, moving it back and forth five times, and the condition of the coating was inspected and evaluated.

Drying time tests were conducted in accordance with Rohm and Haas "Floor Polish Evaluation Methods" 14 tackiness/drying rate. A sabon tack tester and a similarly configured device were used to measure tackiness and the rate of drying. A 80 micron thick polish film was prepared on a tile surface and allowed to sit until dry (until it appeared that the film had dried to the extent that there is no moisture on the surface). Next the tack tester (25.4 mm×25.4mm) was set on the polish film and after a 500 g weight had been applied for a period of 5 seconds, the weight was immediately removed. In the event that the surface was not tack free and it took five or more seconds for the tester to completely separate from the tile, the test was repeated at 30 second intervals until tack free conditions were met. The time (min) required from the application of the polish to a tack free state was then measured.

A Detailed Explanation of the Tack Tester

A 25.4 mm width, 82.6 mm length, 1.6 mm thick aluminum plate was bent to form a flat surface having an area of 6.45 cm². The bend angle was determined so that when a 5 g weight was placed on the 6.45 cm² surface, this would balance with the remaining 57.2 mm section of the aluminum plate. When device adjustments were carried out, the 6.45 cm² surface was covered with 6 micron aluminum foil. Tests were conducted under the conditions of temperature at 20° C. and a relative humidity of 65%, generally using both vinyl and vinyl composition tiles.

TABLE 6

| | Test Items | | | | | | | | |
|---|---|---|---|---|---|---|---|---|---|
| | Emulsion polymer | | | | | | | | |
| | 1 | 2 | 3 | 4 | 5 | 6 | 7 | 10 | 11 |
| Gloss | 86.8 | 85.5 | 86.3 | 87.0 | 87.5 | 83.0 | 84.2 | 81.8 | 86.7 |
| Resistance to black heel marks | Acceptable | Superior | Good | Superior | Superior | Superior | Acceptable | Acceptable | Acceptable |
| Scuffing resistance | Acceptable | Superior | Good | Superior | Superior | Superior | Unacceptable | Unacceptable | Good |
| Water resistance | Superior | Superior | Superior | Superior | Superior | Superior | Good | Good | Good |
| Cleaning agent resistance 1 | Good | Good | Good | Superior | Superior | Superior | Good | Good | Good |
| Cleaning agent resistance 2 | Good | Good | Acceptable | Superior | Superior | Superior | Unacceptable | Unacceptable | Good |
| Drying time (min) | 3.0 | 4.0 | 3.0 | 2.5 | 2.0 | 8.5 | 5.5 | 7.0 | 4.5 |
| Removal | Good | Superior | Superior | Superior | Superior | Superior | Superior | Acceptable | Good |

We claim:

1. A film forming emulsion polymer composition comprising from greater than 60 wt % to 95 wt % of a first emulsion copolymer having a glass transition temperature within the range of from 10°–100° C., and from 5 wt % to less than 40 wt % of a second emulsion copolymer having a glass transition temperature that is lower than that of the first emulsion copolymer and is within the range of from 0°–50° C., wherein the second emulsion copolymer contains from 1 to 8% by weight of nonionic hydrophilic units selected from the group consisting of hydroxy alkyl ester of alpha, beta unsaturated acid, vinyl alcohol, alkyl-phosphato-alkyl acrylates and methacrylates, alkyl-phosphono-alkyl acrylates and methacrylates, and alkyl amides of alpha, beta unsaturated acid, and wherein the second emulsion copolymer contains less than 5% by weight of units originated from vinyl alcohol.

2. The emulsion polymer composition of claim 1 wherein the difference in the glass transition temperature between the first emulsion copolymer and the second emulsion copolymer is 10° C.

3. The emulsion polymer composition of claim 1 further comprising a polyvalent metallic compound, and wherein at least one of either the first emulsion copolymer or the second emulsion copolymer comprises a carboxylic acid group.

4. A floor polish composition comprising the emulsion polymer composition of claims 1.

5. A coating composition comprising the emulsion polymer composition of claims 1.

* * * * *